(12) United States Patent
Berkner et al.

(10) Patent No.: US 12,248,479 B2
(45) Date of Patent: Mar. 11, 2025

(54) DATABASE SYSTEM, DATABASE STRUCTURE, AND ASSOCIATED METHODS

(71) Applicant: Tilo Tech GmbH, Berlin (DE)

(72) Inventors: Stefan Berkner, Blankenfelde-Mahlow (DE); Hendrik Nehnes, Hoppegarten (DE)

(73) Assignee: Tilo Tech GmbH, Berlin (DE)

( * ) Notice: Subject to any disclaimer, the term of this patent is extended or adjusted under 35 U.S.C. 154(b) by 0 days.

(21) Appl. No.: 18/275,527

(22) PCT Filed: Feb. 5, 2021

(86) PCT No.: PCT/EP2021/052837
§ 371 (c)(1),
(2) Date: Aug. 2, 2023

(87) PCT Pub. No.: WO2022/167090
PCT Pub. Date: Aug. 11, 2022

(65) Prior Publication Data
US 2023/0418825 A1    Dec. 28, 2023

(51) Int. Cl.
*G06F 16/2455* (2019.01)
*G06F 16/215* (2019.01)
(Continued)

(52) U.S. Cl.
CPC ...... *G06F 16/24564* (2019.01); *G06F 16/215* (2019.01); *G06F 16/27* (2019.01); *G06F 16/9017* (2019.01)

(58) Field of Classification Search
CPC .. G06F 16/24564; G06F 16/215; G06F 16/27; G06F 16/9017
(Continued)

(56) References Cited

U.S. PATENT DOCUMENTS

| | | | |
|---|---|---|---|
| 9,251,114 B1* | 2/2016 | Ancin | G06F 21/6227 |
| 2016/0094456 A1* | 3/2016 | Jain | H04L 41/5054 |
| | | | 370/235 |

(Continued)

OTHER PUBLICATIONS

Santra Abhishek, et al. "Efficient Community Re-Creation in Multilayer Networks Using Boolean Operations", Procedia Computer Science, vol. 108, 2017, pp. 58-67.

(Continued)

*Primary Examiner* — Phong H Nguyen
(74) *Attorney, Agent, or Firm* — Dicke, Billig & Czaja, PLLC

(57) ABSTRACT

A database structure includes at least one of a distributed data storage structure configured to store a plurality of different entity entries, each entity entry being configured to store datasets. The datasets comprise data and a dataset identifier, each entity entry further being configured to store a header comprising matching edges. Each matching edge comprises a matching rule or a reference to the matching rule, the dataset identifiers of any pairs of datasets which match with each other with respect to the matching rule, an index data structure configured to store matching keys, which refer to a respective matching rule, and dataset identifiers of the datasets corresponding to the respective matching key, a lookup data structure configured to store dataset identifiers and a storage location of the corresponding entity entry in the distributed data storage structure or a reference to the storage location.

20 Claims, 7 Drawing Sheets

(51) Int. Cl.
*G06F 16/27* (2019.01)
*G06F 16/901* (2019.01)

(58) Field of Classification Search
USPC ........ 707/692, 722, 736, 741, 769, 770, 803
See application file for complete search history.

(56) References Cited

U.S. PATENT DOCUMENTS

| | | |
|---|---|---|
| 2016/0094661 A1* | 3/2016 | Jain ..................... H04L 12/56 709/227 |
| 2017/0180321 A1* | 6/2017 | Nimmagadda ..... H04L 63/0263 |
| 2019/0179651 A1* | 6/2019 | Chereshnev ....... G06K 7/10366 |

OTHER PUBLICATIONS

Rai Anish: "MLN-Subdue: Decoupling Approach-Based Structure Discovery in Multilayer"., May 1, 2020, pp. 1-63.
International Search Report and Written Opinion in PCT/EP2021/052837 dated Oct. 19, 2021.

* cited by examiner

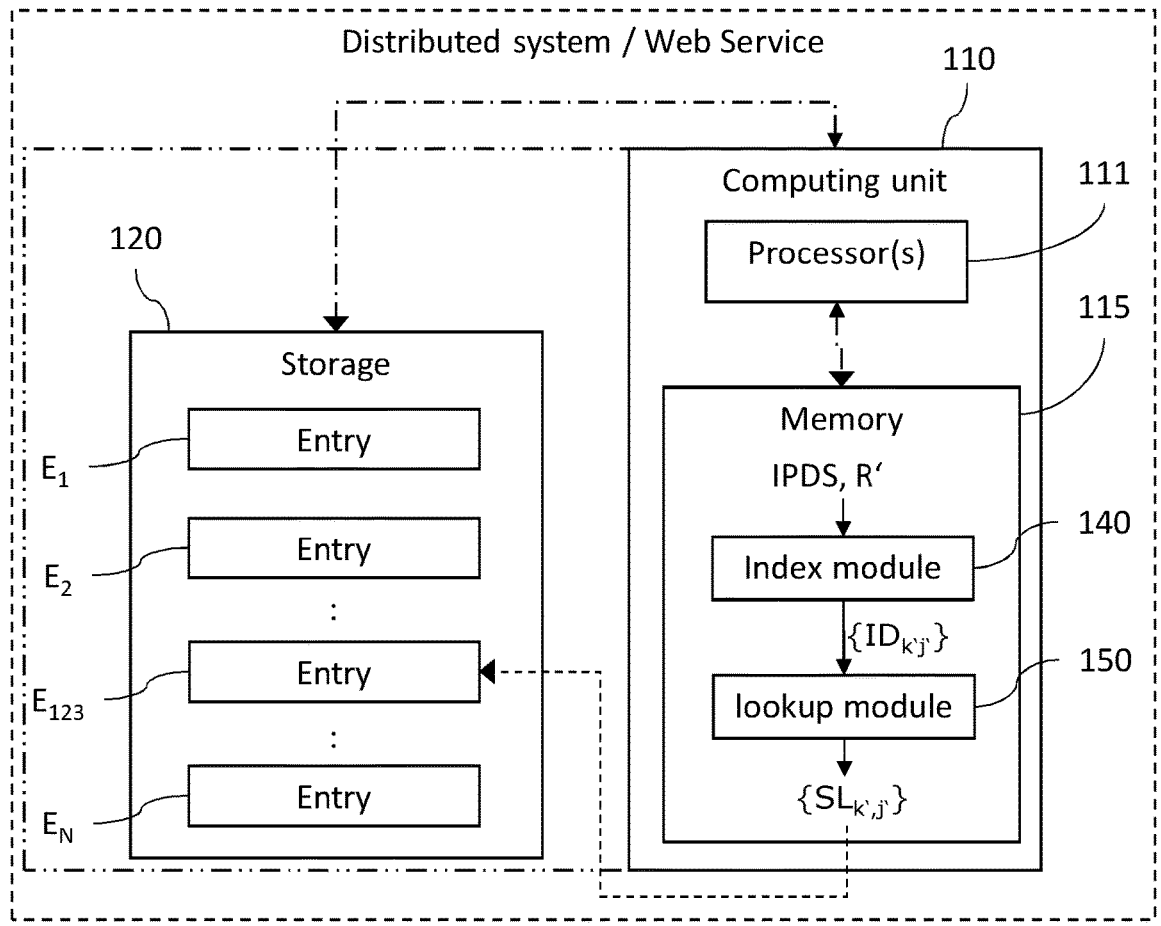
$E_k=\{H_k, \{DS_{kj}\}\}$, $DS_{kj}=\{ID_{kj}, D_{kj}\}$, $H_k=\{ED_{km}\}$, $ED_{km}=\{ID_{kj}, ID_{kj'}, RId\}$
FIG 1A
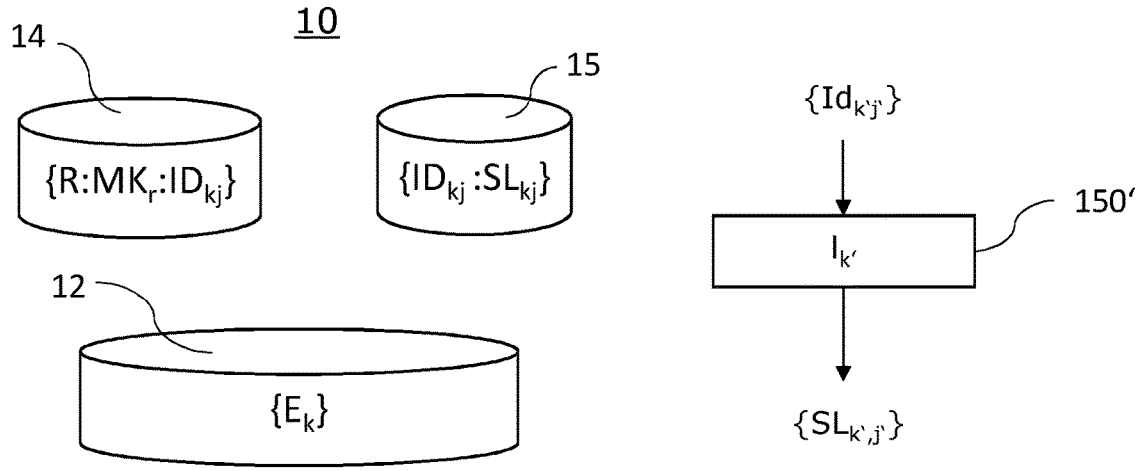
FIG 1B
FIG 1C

DATABASE SYSTEM, DATABASE STRUCTURE, AND ASSOCIATED METHODS

CROSS-REFERENCE TO RELATED APPLICATIONS

This Utility Patent Application claims priority under 35 U.S.C. § 371 to International Application Serial No. PCT/EP2021/052837, filed Feb. 5, 2021, which is incorporated herein by reference in their entirety.

TECHNICAL FIELD

Embodiments of the present invention relate to a database structure, a database system and methods for creating, managing, maintaining and/or using a database, in particular a method for determining an entity.

BACKGROUND

Infectious pathogens, in particular airborne germs such as bacteria, for example tuberculosis bacteria, and viruses, in particular influenza and corona viruses may pose major challenges to public health and/or may have high social and/or economic impacts in a country, and possibly globally in the event of a pandemic. For example, 1,000 to 35,000 people can die each year as a result of an infection with influenza or corona viruses in Germany alone.

In order to contain or at least reduce the spread of infectious diseases, fast and reliable tracking of cases of infection is often of paramount importance. For this purpose, huge amount of data records may have to be evaluated to identify potentially infected persons and clusters of potentially infected persons, respectively, as well as to estimate their risk of infection. People of sufficiently high risk are timely to be informed, advised or even ordered to do a test and/or to go into quarantine.

As the data records are often not stored uniformly, but heterogeneously and may also contain errors, entity resolution could play an important role during evaluating these and other data records.

Existing methods for this purpose, e.g. methods based on graph databases using topographical data models to store data records may be limited with respect to scalability, not energy and/or resource efficient enough, and/or to elaborate and/or to slow for a given computing hardware, in particular if new data records are to be integrated, and/or existing data records are to be deleted, manipulated and/or evaluated. For example, these processes likely become cumbersome if the graph or tree structure of a (large) database has a tree-depth of at least 5 or 6. Further, manipulating existing as well as adding of new data to a database organizing the data records in blocks typically requires recalculating for one or more of the blocks which is computational demanding, at least for larger databases.

For these and other reasons there is need for the present invention.

SUMMARY

At least the above-mentioned issues are addressed by the subject matter of the appended claims.

According to an embodiment of a database structure, the database structure includes a distributed data storage structure configured to store a plurality of different entity entries, an index data structure configured to store matching keys, and/or a lookup data structure configured to store dataset identifiers and storage locations of corresponding entity entries in the distributed data storage structure or respective references to the storage locations, in particular pairs of dataset identifiers and storage locations (or references to the storage locations). Each entity entry is configured to store datasets each including data and a dataset identifier. Further, each entity entry is configured to store a header including matching edges. Each matching edge includes a matching rule or a reference to the matching rule, and the (two) dataset identifiers of any pairs of datasets which match with each other with respect to the matching rule. The index data structure is configured to store matching keys referring to a respective matching rule, and the dataset identifiers of the datasets which corresponds to the respective matching key.

Note that the formulation that two datasets are matching (with each other) as used herein intents to describe that their data matches with respect to one or more matching rules (while the dataset identifiers also referred to as dataset IDs for short are different).

The index data structure is typically configured to store matching keys and the dataset identifiers of all datasets matching with the matching key.

Typically, the database structure at least includes the distributed data storage structure, more typically the distributed data storage structure, the index data structure and the lookup data structure.

Further, the index data structure and the lookup data structure are typically stored separately from each other and from the distributed data storage structure (the plurality of entity entries).

The distributed data storage structure as explained herein may be used in different scenarios, in particular for reliably and quickly tracking and analyzing infection chains and/or clusters, e.g. in an epidemic or even pandemic scenario, with the goal of enabling automatically informing the affected persons and putting them into quarantine or pledge them to do a test and prevent further spread, for tracking components of products or for building statistics from different public or non-public data sources such as population statistics, but also for other scenarios, in particular those in which at least partly unreliable data sources (sets) are involved.

Typically, each entity entry refers to a respective object, such as an entity or identity, in particular an object of the same type, typically to one object only. Note that the entity entries may refer to persons (i.e. the objects may be person related and represent persons, respectively).

Further, each dataset of an entity entry typically refers to one or more predicates of the respective object (in the following also referred to as attributes), for example a test result, contact data, a restaurant visit or theatre visit of a person and the like in an epidemic or pandemic scenario. In these and other embodiments, the entity entries may include datasets and predicates, respectively, representing personal data, i.e. any information relating to an identifiable (natural) person also known as personally identifiable information (PII) such as name, social security number, date and place of birth, mother's maiden name, sex, age, profession, (postal) address, telephone number or email-address, and datasets and/or predicates, respectively, representing measurements such as medical/health data (which may also be considered as PII, at least if biometric data are involved) and test results.

The datasets stored in an entity entry (stored predicates) may be considered as representing the entity, e.g. a person, for a specific purpose or scenario. Thus, entity resolution may be considered to find for an input dataset a matching entity entry. Optionally, the found entity entry may be updated and/or data of the found entity entry retrieved, for example a previously stored telephone number or email-address that may be used for contacting the identified person in epidemic/pandemic scenario.

The structure of the entity entries (header and datasets) typically depends on the purpose or scenario and the model used for describing the scenario, respectively.

In many applications/scenarios such as those referring to tracking and analyzing infection chains and/or clusters, to population statistics or to a credit check, entity entries include datasets allowing for address data determination and/or address data matching.

Therefore and for reasons of clarity, the detailed description below is mainly focused on embodiments which are related to address data determination and/or address data matching.

Using the distributed data storage structure as explained herein has several advantages, in particular with respect to required storage, maintenance and performance, in particular scalability and accessibility.

Due to the structures and the distributed storage of data, e.g. in a cloud, data can be read and stored in real time or close to it (millisecond range, even in case of cloud storage mainly depending on the quality of the data line/data connection), even with very large amounts of data (e.g. more than several thousands of datasets, more than hundreds of thousands of datasets or even more than 1 million datasets, more than several million datasets, or more than 100 million datasets).

Fast data access may be facilitated by the lookup data structure.

In one embodiment, the entity entries are stored as separate files.

Alternatively and/or in addition, access times can be kept particularly low (reduced compared to other concepts) if the header of one or more, typically of each of the entity entries further includes a respective list of the dataset identifiers stored in the respective entity entry. This only slightly increases the storage requirement. In the following, a list of the dataset identifiers stored in a header is also referred to as referrer (of an entity entry).

Storage space can be kept comparatively low as each dataset is typically stored in one entity entry only.

Alternatively and/or in addition, storage can be kept particularly low (reduced compared to other concepts) if the header of one or more, typically of each of the entity entries is configured to store a duplicate edge including a duplicate rule or a reference to the duplicate rule such as a duplicate rule identifier, and dataset identifiers of pairs of datasets which match with each with respect to the duplicate rule.

The term "matching rule" as used herein intends to describe an instruction or rule for pairwise comparing datasets according to one or more given criteria resulting in a binary output or result (match/no match).

Likewise, the term "duplicate rule" as used herein intends to describe an instruction or rule for pairwise comparing datasets according to one or more given criteria resulting in a binary output or result (match/no match) which corresponds to/is related to one of the "matching rules", and configured to be used for determining duplicates (in the following also referred to as secondary datasets, duplicates of (primary) datasets and duplicates for short) for a given (primary) dataset with respect to a matching rule, in particular non-identical duplicates.

Details of rule definitions and dependencies may again depend on the scenario and used model, respectively. A duplicate rule may be less strict than a matching rule. For example, a matching rule may compare two datasets or parts thereof bitwise or character-wise and only return the output "match" if the two datasets or the respective parts matches bitwise or character-wise, while a corresponding duplicate rule may be less strict and return the output "match" if the two datasets or the respective parts matches bitwise or character-wise in accordance with a given criterion such as a distance (such as a predefined measure for a distance between numbers or words, e.g. a maximum Levenshtein distance of words to detect spelling errors), or a matching rule may be case sensitive while a duplicate rule is case insensitive. Accordingly, duplicates of datasets may be determined. Likewise, a duplicate rule may be stricter at least in part than a matching rule for determining duplicates. For example, duplicate rule may additionally request matching of a house number of an address but may be less restrictive with respect to spelling of the street name in the datasets.

Defining duplicate rules for matching rules and separately storing duplicate edges in the headers allows for significantly reducing storage space compared to storing duplicates in matching edges which would require storing potentially large numbers of pairs of dataset identifiers referring to pairs of datasets which match with each with respect to the matching rule(s). Accordingly, only a part of the pairs of dataset identifiers has to be stored (in the matching edges and the duplicate edges).

The headers of the entity entries can typically store several matching edges (each including a respective matching rule or a reference thereto such as a matching rule identifier, and the corresponding/matching dataset identifiers) and/or duplicate edges (each including a respective duplicate rule or a reference thereto such as a duplicate rule identifier, and the corresponding/matching dataset identifiers).

The matching rules may be selected from a set of rules.

Further, the respective headers may include static and/or dynamic edges. For example, a flag for each edge indicating if the edge is static or dynamic may be used for this purpose. However, a separate flag is often not required. In these embodiments, all edges are considered as dynamic unless their rule identifier indicates this, for example by using a common static rule identifier. The term "static edge" as used herein intends to describe that the edge is considered as ground truth and therefore as immutable during deleting of (other) stored datasets and adding new datasets which are not referred to as new ground truth and super datasets respectively. Different thereto, the term "dynamic edge" as used herein intends to describe that the edge can be amended when stored datasets are deleted from or new datasets are added to the respective entity entry.

The index data structure facilitates searching as it is configured to store optimized data (in form of matching keys each of which correspond to a respective matching rule, and is linked to the dataset identifiers of matching datasets, i.e. datasets matching with the respective matching rule and the matching key, respectively) for searching during both actual search and matching processes.

The term "matching key" as used herein intends to describe a data structure configured to store a rule (typically a matching rule) and/or reference thereto, such as a rule identifier, and matching data of a dataset and/or a reference thereto such as a corresponding dataset identifiers of the dataset corresponding to matching with the respective matching key.

For example, a matching key for a matching rule referring to three data fields "firstName", "lastName" and "street" of datasets may be created by concatenating the matching rule identifier and the lower-case variants of the three fields firstName, lastName and street of a dataset and using a suitable separator character such as ":" between the lower-case variants. In the following, the character ":" is used as exemplary separator.

Further, index data structure may be implemented as a table or an array (index table or index array) linking the matching keys with the dataset identifier and any matching data of the respective dataset.

According to an embodiment of a data management system, in particular a database system, the system includes a computing unit comprising a processor, and a storage accessible by the computing unit, and storing an instance of a distributed data storage structure as explained herein, i.e. a distributed data storage structure configured to store a plurality of different entity entries as explained herein.

The system is typically implemented as a distributed system, in particular as a respective web system or service hosting the instance of the distributed data storage structure and configured for communicating with clients for receiving requests and delivering results, typically using the hypertext transfer protocol (HTTP) or the like.

In one embodiment, the system includes a computing unit having one or more processors, and a storage accessible by the computing unit, and configured to store different entity entries, wherein the entity entries are configured to store a respective header and respective datasets including data and a corresponding dataset identifier. The header may store matching edges including a corresponding matching rule or a reference thereto, and the pairs of dataset identifiers of the datasets which match pairwise with each other according to the matching rule.

The computing unit may even be configured to create an instance of the database structure as explained herein.

For this purpose, the computing unit has typically access to a typically separate computer-readable medium comprising instructions which, when executed by the computing system, cause the computing system to create an instance of the database structure as explained herein and/or to carry out the steps of the methods for creating, managing and/or using a database as explained herein.

According to an embodiment, a database system includes a computing unit comprising a processor, a storage accessible by the computing unit, and storing different entity entries. At least one of the entity entries includes a header and datasets. Each of the datasets includes data and a dataset identifier. The header includes a matching edge. The matching edge includes a matching rule or a reference thereto, and the dataset identifiers of the datasets matching pairwise with each other according to the matching rule. The database system includes at least one of, typically both of an index module and a lookup module. The index module is, when executed by the computing unit, configured to determine, for an input dataset and a given matching rule, dataset identifiers of (stored) datasets matching with the input dataset according to the given matching rule. The lookup module is, when executed by the computing unit, configured to determine, for an input of one of, typically all of the dataset identifiers, a storage location of the corresponding entity entry on the storage or a reference to the storage location.

The header of at least one of the entity entries may include several matching edges each comprising a respective matching rule.

As already explained above, the respective matching rule may be selected from a (predefined) set of rules, and/or may be marked as static or dynamic.

Further, the header of at least one of the entity entries may store a list of the dataset identifiers of the respective entity entry.

A dataset may store a first primary dataset and a first secondary dataset matching with the first primary dataset both according to the matching rule and according to a duplicate rule which is related to but different to the matching rule. In these embodiments, the respective header typically stores a duplicate edge including the duplicate rule or a reference thereto, the dataset identifier of the first primary dataset and the dataset identifier of the first secondary dataset.

Typically, the header stores at most, typically less than n−1 matching edges per matching rule (due to the differently stored duplicates), with n corresponding to the number of datasets of the respective entity entry.

In other words, the header of the entity entry does typically not include a matching edge referring to the first primary dataset and the first secondary dataset (determined to be a duplicate dataset for the first primary dataset).

Accordingly, storage space may be reduced significantly.

The index module is, when executed by the computing unit, typically configured to access an (instance of an) index data structure, which is for reasons of computational efficiency typically implemented as a table or array (and does typically not store the first secondary dataset to save storage space), linking matching keys, which refer to a respective index rule, with dataset identifiers of the datasets corresponding to (fitting/matching with) the matching keys.

The term "module" as used herein shall embrace software instructions for performing method steps when executed by a computing unit.

The term "index rule" as used herein intends to describe any rule as used herein which are typically stored in an index rule set.

Likewise, the lookup module is, when executed by the computing unit, typically configured to use a respective array structure or a table structure linking dataset identifiers with the storage location of the corresponding entity entry (storing the dataset) or a reference thereto.

As already explained above, the matching keys may include data of the corresponding dataset and/or a rule identifier for the matching rule. This may increase speed.

The database system may further include a matching module that is, when executed by the computing unit, configured to at least one of:
- accessing the instance of the index data structure;
- receiving an input comprising data, the input may already be structured similar to or as the datasets described herein, typically including a dataset ID;
- determining, for the input and a selected rule, a new matching key;
- searching, in the instance of the index data structure, for matching keys that match with the new matching key;
- determining that the data of the input do not match with data of stored datasets if no matching keys stored in the instance of the index data structure are found during the searching for the matching keys;
- searching for rules with equal matching keys, wherein searching for rules comprises comparing the data with datasets referred to by the matching keys;
- determining that the data of the input matches with data of stored datasets if at least one rule is found during searching for rules with equal matching keys;
- determining that the data of the input do not match with data of stored datasets if no rule is found during searching for rules with equal matching keys;

creating a matching edge for the data of the input matching with the data of stored datasets, i.e. a respective matching edge between the stored datasets and a dataset typically comprising the data and the dataset ID of the input; and marking the created matching edge as dynamic edge.

The database system may further include a search module that is, when executed by the computing unit, configured to create, for the input search, a matching key having a rule identifier and first matching data; use the matching key to search in (an instance of) the index data structure for dataset identifiers of matching datasets (which are linked to the matching key and stored matching data); determine a list of dataset identifiers of the datasets and their rule identifiers; use the dataset identifiers of the determined list to determine a storage place of entity entries storing the datasets; and retrieve the entity entries.

Further, the database system typically includes a control module which is, when executed by the computing unit, configured to at least one of receiving an input; using the matching module to search for a stored dataset storing data matching with data of the input; adding the data of the input to the stored dataset found during the search (updating the stored dataset); creating a new entity entry including a dataset with the data of the input if no stored dataset is found during the search; determining, for the new dataset and an index rule, at least one of a new matching key and an matching edge; and storing the new matching key and a dataset identifier for the new dataset in the (instance of the) index data structure.

The control module may include an assemble module that is, when executed by the computing unit, configured to use the instance of the index data structure to search if data of a new dataset match with data of datasets stored in the database system, i.e. in the entity entries; create a new entity entry if the data of a new dataset do not match with the data datasets already stored in the database system; update an entity entry if the data of the new dataset match with data of only one of the datasets already stored in the database system; and/or merging respective entity entries if the data of the new dataset match with data of more than one of the datasets already stored in the database system.

According to an embodiment of a method, the method includes providing a database system as explained herein and/or an instance of database structure as explained herein.

Providing the instance of the database structure may include creating the instance of the database structure. This typically includes creating an instance of a distributed data storage structure as explained herein, in the following also referred to as distributed database, as well as entity database and identity database for short, creating an instance of an index data structure (also referred to as runtime index data structure) as explained herein, and/or creating an instance of lookup data structure (also referred to as runtime lookup data structure) as explained herein.

Providing the instance of the database structure may further include initializing the created instances and/or an index rule set storing index rules.

The method may be used for creating, maintaining, managing and/or using the database.

Accordingly, the method may include any of the following further processes:

receiving an input comprising data, the input may already be structured similar to or as the datasets described herein, but may not include a (yet assigned) dataset ID;

determining, for the input and a selected index rule, a new matching key;

searching for matching keys stored in the instance of the index data structure that match with the new matching key;

determining that the data of the input do not match with data of stored datasets if no stored matching keys matching the new matching key are found during searching for the matching keys;

comparing the data of the input with datasets referred to by the matching keys for searching for rules with equal matching keys;

determining that the data of the input matches with stored datasets if at least one rule is found during the searching for rules with equal matching keys, and that the data of the input do not match with data of stored datasets if no rule is found during the searching for rules with equal matching keys.

After determining that the data of the input do not match with data of stored datasets, the method may further include at least one of, typically all of:

determining (creating and/or storing) a new dataset comprising the data of the input and a corresponding (a new) dataset identifier;

creating a new entity entry comprising the new dataset; and storing the new matching key and the dataset identifier for the new dataset in the instance of the index data structure.

After determining that the data of the input match with stored datasets, the method may further include:

updating an entity entry if the data of the new dataset match with only one of the datasets already stored in the database system; and/or merging respective entity entries if the data of the new dataset match with more than one of the datasets already stored in the database system.

Updating the entity entry may include one of, typically both of:

determining a matching edge for the data of the input and the data of the one of the datasets already stored in the database system, i.e. creating and/or storing a matching edge between the stored dataset and the new dataset (comprising the data and of the input and the new dataset ID); and using a duplicate rule for determining a duplicate edge for the data of the input and the data of the one of the datasets already stored in the database system.

According to an embodiment of a method for determining of an entity, in particular an identity, and/or properties (predicates) thereof, the method includes providing at least one of a database system as explained herein and a database structure configured to store a plurality of different entity entries as explained herein, and at least one of determine, for an input dataset and a given rule, in particular a given search or matching rule, a dataset identifier of a dataset which is stored in an instance of the database structure and matches with the input dataset according to the given rule, and determine, for the determined dataset identifier, a storage location of the corresponding entry or a reference to the storage location.

The method may further include retrieving data of the corresponding entry, using the retrieved data for further processing such as informing a person represented by the entity entry and/or updating the corresponding entry in accordance with the input.

According to an embodiment, a computer program product and/or a computer-readable medium includes instructions which, when executed by a computing system, in particular a computing system as explained herein, cause the computing system to create and/or access an instance of a database structure as explained herein and typically also an instance of an index data structure as explained herein and an instance of a lookup data structure as explained herein, and/or to carry out the steps of the methods as explained herein.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings:

FIG. 1A is a block diagram schematically illustrating a database system according to an embodiment;

FIG. 1B is a block diagram schematically illustrating a database structure according to an embodiment;

FIG. 1C is a block diagram schematically illustrating a module that may be used in the database system illustrated in FIG. 1A according to an embodiment;

DETAILED DESCRIPTION

Figure 2:
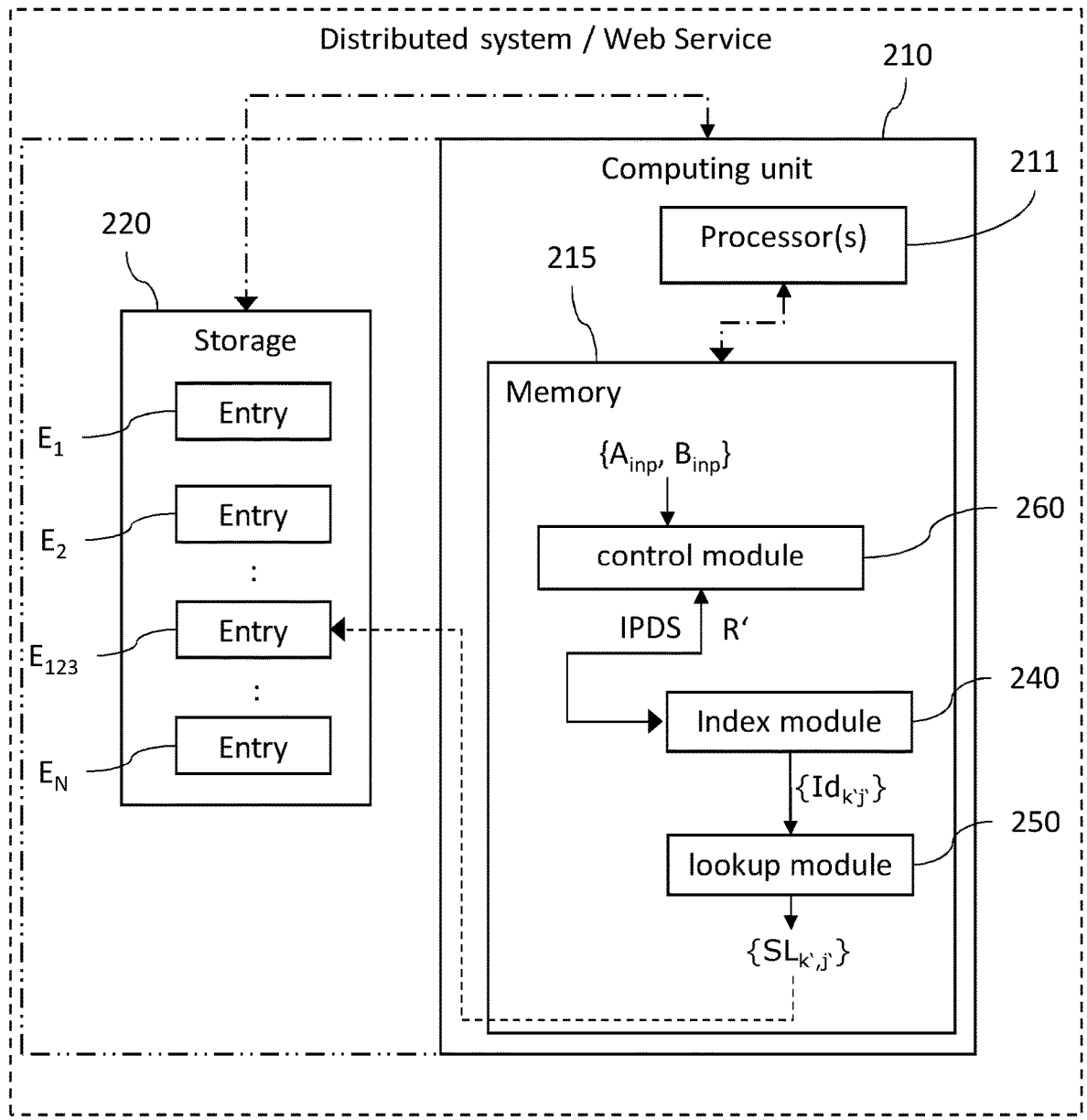
FIG. 2 is a block diagram schematically illustrating a database system according to an embodiment.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. Further, the detailed description is focused on embodiments which are related to address data determination and/or address data matching, and as such on identity resolution as an exemplary example for entity resolution.

An identity (entity) may be defined by the sum of predicates, that belong to the same object. This object may be a person, a thing or even an abstract concept. In a computer system this typically means that the identity object is defined by a list of datasets that describe its properties and/or behavior, i.e. its predicates. An identity may be complete, meaning that all of its relevant predicates are known. However, often only a subset of the relevant predicates is available.

Entity/identity resolution may be described as a process of matching predicates with each other and assigning them to their entity/identity, in particular by creating clusters of predicates that represent entities/identities (for a given scenario/model). This typically also includes transitive linking between the predicates of an entity/identity, i.e. if the predicates a and b match and b and c match, then a and c both belong to the entity/identity. Furthermore, one predicate can belong to one entity/identity only.

The herein provided systems, structures and methods which are related to entity/identity resolution can be applied to fields from many kinds of industries.

One embodiment refers to tracking and analyzing infection clusters during an epidemic or even pandemic. In this embodiment, herein provided systems, structures and methods can be used to combine (all) available data from various data sources together to form a cluster of potentially infected persons. The formed clusters may be used to determine and inform persons at risk, instruct them to go into quarantine, offer them a test and/or even offer them a vaccination depending on the risk. Accordingly, further spread of the infection may be contained or at least reduced.

The data sources may inter alia include:
personal data and test results from tested persons;
contact lists provided from persons with positive test results;
registration lists from certain events, e.g. restaurant visits;
phone number lists from phone providers.

At least some of the data sources may contain unreliable data. For example, unlike the phone number lists of phone providers, contact data of the contact lists and/or the registration lists likely include some spelling errors or even fake phone numbers This makes data reconciliation and thus reliable tracing of infection chains very difficult.

In this regard, the main advantages for using the entity/identity resolution provided herein are:
it can handle huge amounts of datasets simultaneously,
it can work on heterogeneous data sources,
is fault tolerant towards flawed datasets, and
allows very fast processing of new datasets and event notification.

Especially, fast processing of new datasets and event notification can be a big advantage. Assuming all data are available digitally, then it would be a matter of less than a second between entering the positive test result and informing persons at potential risk.

Another embodiment refers to component tracking. Many (complex) products contain various subcomponents, which itself can also contain other subcomponents and so on. Often these products and components can be identified by a serial number. However, it is possible that it is hard to track which (sub)components have been used for a certain product (serial number).

Using the entity/identity resolution as explained herein allows for to setup a central register (based on or accessible by a database system as explained herein) where it is possible to see which components have been used and also to setup automatic notifications for the final product for cases when a possible incident has been identified in one of the (sub)components. This may especially be important for products where a failure might endanger life, like air planes or chemical factories.

For example, a manufacturer F of a subcomponent of a component (manufactured by a further manufacturer) of a final product (manufactured by yet a further manufacturer) may provide a warning into the central register, that the component with serial number F-555 might have a certain issue without the need to know who is actually using this component and the final product, respectively. The consumer of the final product on the other hand might opt-in to receive notifications whenever there is a potential incident for this product.

Further automation could easily be applied to this example. Consider that the component with serial number F-555 is able to measure its own condition and regularly push the results into the central register. A monitoring module which is receiving the change notifications from the central register may react to certain thresholds and issue a warning back into the central register. Thus, a final product using the component with serial number F-555 could receive the warning and could react on it by e.g. shutting down non-critical subsystems or issue an alarm.

Here, one main advantage is that all events and information of all (sub)components can be stored centrally and kept up to date as long as desired.

The following examples are described using specific language which should not be construed as limiting the scope of the appending claims. The drawings may not be scaled and are for illustrative purposes only. For clarity, the same elements or manufacturing steps have been designated by the same references in the different drawings if not stated otherwise.

FIG. 1A is a block diagram schematically illustrating a database system 100.

In the exemplary embodiment, database system 100 is implemented as a distributed system and includes a computing unit 110 with one or more processor 111, and a typically remote storage 120 which is accessible by computing unit 110 as indicated by the dashed-dotted arrow in FIG. 1A.

Storage 120 stores different entity entries $E_1$-$E_N$, $E_k$ each having a header $H_k$ and one or more datasets $\{DS_{kj}\}$ (with subscripts k, j as indices, k=1 . . . N). The brackets { } indicate that each entity entries $E_k$ is at least configured to store and typically also stores several datasets $DS_{kj}$ during runtime.

Typically, each entity entry $E_k$ is stored as and/or in a separate file.

Each dataset $DS_{kj}$ of entity entry (entity file in the exemplary example) $E_k$ includes data $D_{kj}$ (in particular respective predicates) and an identifier $ID_{kj}$ for the dataset (dataset identifier).

As further illustrated in the lowermost part of FIG. 1A, the header H k includes matching edges $\{ED_{km}\}$ storing a respective matching rule or a reference (rule identifier) RId to the matching rule, and the dataset identifiers $ID_{kj}$, $ID_{kj'}$ (j≠j') of the datasets $DS_{kj}$ matching pairwise with each other according to the respective matching rule.

In Backus normal form (BNF), an entity file (of a plurality of entity files) may have the following structure:
    <EntityFile>::=<Header> <EOL> <Data>
    <Data>::=<DataSet>|<DataSet> <EOL> <Data>

In this example, the <DataSets> may contain any kind of data except the <EOL>::="\n".

For the following examples, <Header> and <DataSet> will be serialized as compact JSON according to RFC 8259 of the Internet Engineering Task Force (IETF). This may not be the most efficient way of storing, but is well suited for readability.

The structure of the datasets (<DataSet>) is typically dependent on the used data model. Depending on the requirements, there will be at least one implementation of a dataset, but there may be various implementations used (even across a single entity entry).

For example, a particular dataset with dataset identifier (in the following also referred to as dataset ID) 123, additional optional metadata and exemplary data (predicates) of a fictive person Max Muster may look as follows:
<Data Set>:
    {"id", "123", "meta", {"created", "2020-09-08 17, 45, 00", "imported", "2020-09-08 17, 45, 05", "source", "external"}, "person", {"firstName", "Max", "familyName", "Muster", "dateOfBirth", "1990-12-31", "gender", "MALE"}, "address", {"street", "Wallstr.", "houseN umber", "58", "postCode", "10179", "city", "Berlin"}, "email", "max@example.com"}

Likewise a matching edge defining how two datasets match with each other with respect to a matching rule may be defined in BNF using the respective dataset identifiers and the rule identifier as:
    <Edge>::=<DataSetID>":"<DataSetID>":"<RuleI D>

It is possible that multiple edges exist between two datasets (when more than one rule is used).

This is illustrated in FIG. 5A to FIG. 6B.

Figure 5A:
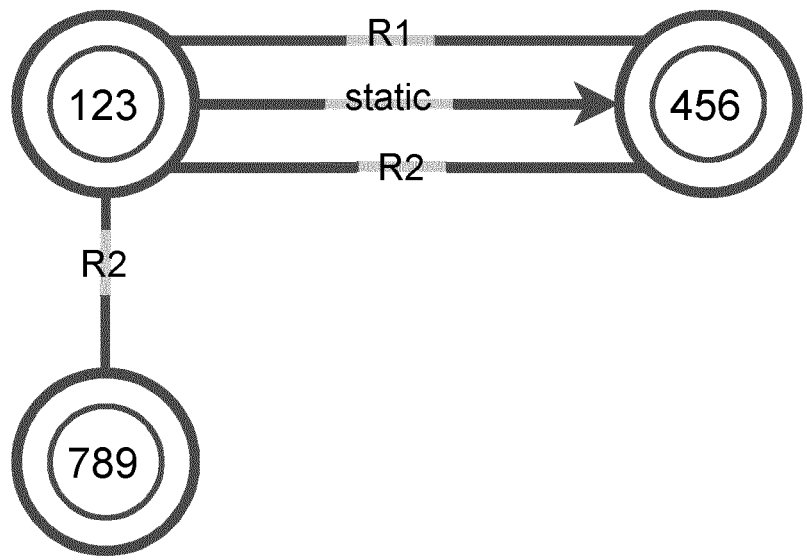
FIG. 5A to FIG. 6B schematically illustrate entity entries of a data storage structure according to embodiments.

FIG. 5A shows a graphical representation of three exemplary datasets:

123

456

789 shown as circles (forming nodes), wherein dynamic edges corresponding to rules R1, R2 are represented by respective (connecting) lines, and a static edge is represented by an arrow. The rules are represented in FIG. 5A by their respective rule identifier (in the following also referred to as rule ID for short) R1, R2, static at the respective edge.

Note that there are two kinds of edges, static edges and dynamic edges.

Static edges are created from multiple datasets inside one so-called super dataset considered as ground truth, typically in accordance of a static rule sets each having the exemplary rule ID "static". Static edges may be directed and thus represented by arrows.

Different thereto, undirected dynamic edges are created during the matching process as explained below in more detail.

Typically, each datasets of an entity entry is connected with at least one further datasets of an entity entry via a respective edge. As a result each entity entry may have at least n−1 edges, with n being the number of datasets without duplicates.

In the present application, it is suggested that duplicates, more precisely non-identical duplicates, are stored differently to reduce the amount of indexed entries and even more important the amount of edges.

For illustrative purposes, the following four simplified datasets with dataset identifiers A, B, C, D are given in table I:

| ID | firstName | familyName | street | houseNumber | email |
|----|-----------|------------|--------|-------------|-------|
| A | Max | Muster | Wallstr. | 58 | max@example.com |
| B | Max | Muster | Wallstr. | 58a | mm@example.com |
| C | Max | Muster | Wallstr. | 58 | max@example.com |
| D | Max | Muster | Wallstr. | 58a | muster@example.com |

Furthermore the following two matching rules are defined:
R1: firstName, lastName and street (of two datasets) must be equal for matching
R2: firstName and lastName (of two datasets) must be equal for matching According to these rules, the following edges may be created:
A:B:R1
A:B:R2
A:C:R1
A:C:R2
A:D:R1
A:D:R2
B:C:R1
B:C:R2
B:D:R1
B:C:R2
C:D:R1
C:D:R2

Figure 5B:
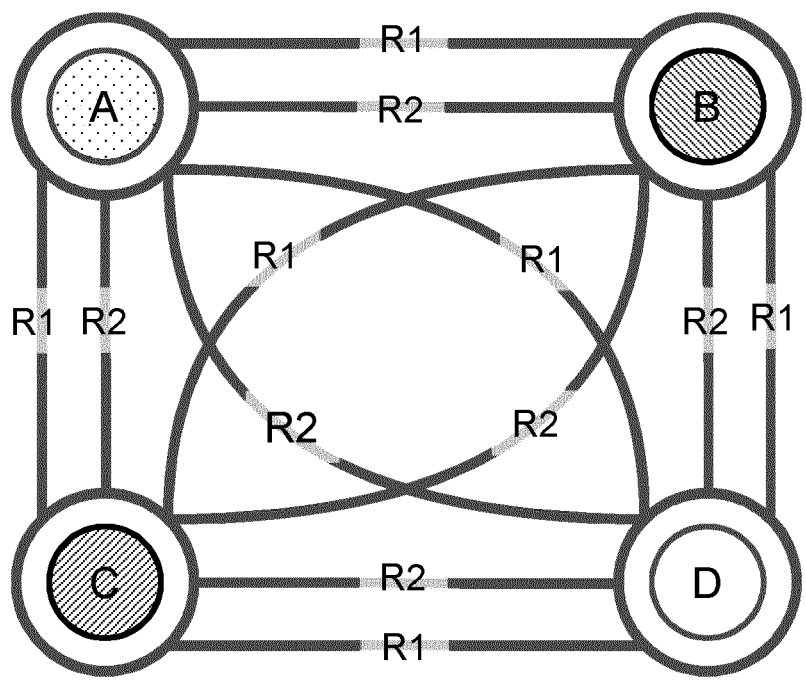

A graphical representation is shown in FIG. 5B.

Thus, even with only four datasets and two rules, a total number of 12 edges results. Assuming that datasets of each pair of datasets matches with each other, a total number of edges can be calculated to be:

$$r*n*(n-1)/2 \text{ (with } n\text{=number of datasets and } r\text{=number of rules).}$$

Assuming each dataset ID requires only a minimum of 4 bytes and a rule ID requires a minimum of 1 byte plus 2 bytes for separating the edge triplet, results in a total of 11 bytes per edge. This would require more than 1.048 MB (~1 GB) of edge data for 10.000 datasets and two rules. Real implementations would most likely use even larger IDs, preferably an UUID, resulting in even bigger storage requirements.

In order to circumvent possible memory issues resulting therefrom, one or more duplicate rules may be used. For the above example of Table I with datasets A-D, a duplicated rule may be defined as:
D1: firstName, lastName, street and houseNumber (of two datasets) must be equal for matching In this example, the email-field was explicitly not included to show that only the matching relevant attributes are to be checked.

Note that the duplicate rule D1 should be applied before the actual matching happens. After applying duplicate rule D1, entity entry with the datasets A-D contains only the two matching edges:
A:B:R1
A:B:R2
and two duplicate edges (C is a duplicate to A, and D is a duplicate to B according to duplicate rule D1).

Figure 6A:
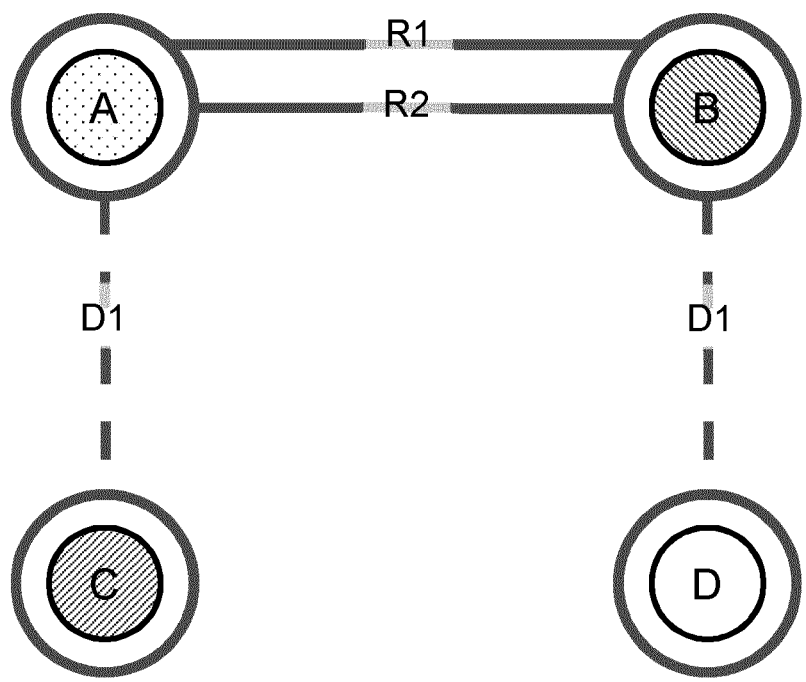

Thus, instead of 12 matching edges (FIG. 5B) only two matching edges and two duplicate edges are to be stored. The resulting entity entry may be graphically represented as shown in FIG. 6A.

The duplicates may e.g. be stored in the following structure:
{"A": ["C"], "B": ["D" "E", "F"] }

Accordingly, the corresponding entity entry (entity file) may look as follows:
{"referrer":["A","B","C","D"], "edges":["A:B:R1","A:B:R2"],"duplicates":{"A":["C"],"B":["D"]}}
{"id":"A","meta":{"created":"2020-09-08 17:45:00", "imported":"2020-09-08 17:45:05","source":"external}", "person":{"firstName":"Max","familyName": "Muster","dateOfBirth":"1990-12-31","gender": "MALE"}, "address":{"street":"Wallstr.","houseNumber":"58", "postCode":"10179","city":"Berlin"}, "email":"max@example.com"}
{"id":"B","meta":{"created":"2020-09-09 17:45:00", "imported":"2020-09-09 17:45:05","source":"external"}, "person":{"firstName":"Max","familyName": "Muster", "address":{"street":"Wallstr.", "houseNumber":"58a","postCode":"10179","city": "Berlin"}, "email":"mm@example.com"}
{"id":"C","meta":{"created":"2020-09-09 17:45:00", "imported":"2020-09-09 17:45:05","source":"external"}, "person":{"firstName":"Max","familyName": "Muster"}, "address":{"street":"Wallstr.", "houseNumber":"58","postCode":"10179","city": "Berlin"},"email":"max@example.com"}
{"id":"D","meta":{"created":"2020-09-12 16:21:03", "imported":"2020-09-12 16:21:05","source":"external"}, "person":{"firstName":"Max","familyName": "Muster"}, "address":{"street":"Wallstr.", "houseNumber":"58","postCode":"10179","city": "Berlin"}, "email":"muster@example.com"}.

Note that the header:
{"referrer":["A","B","C","D"],"edges":["A:B:R1","A:B:R2"],"duplicates":{"A":["C"],"B":["D"]}}
of the exemplary entity entry also includes a complete list of the dataset identifiers A-D stored as referrer.

Figure 6B:
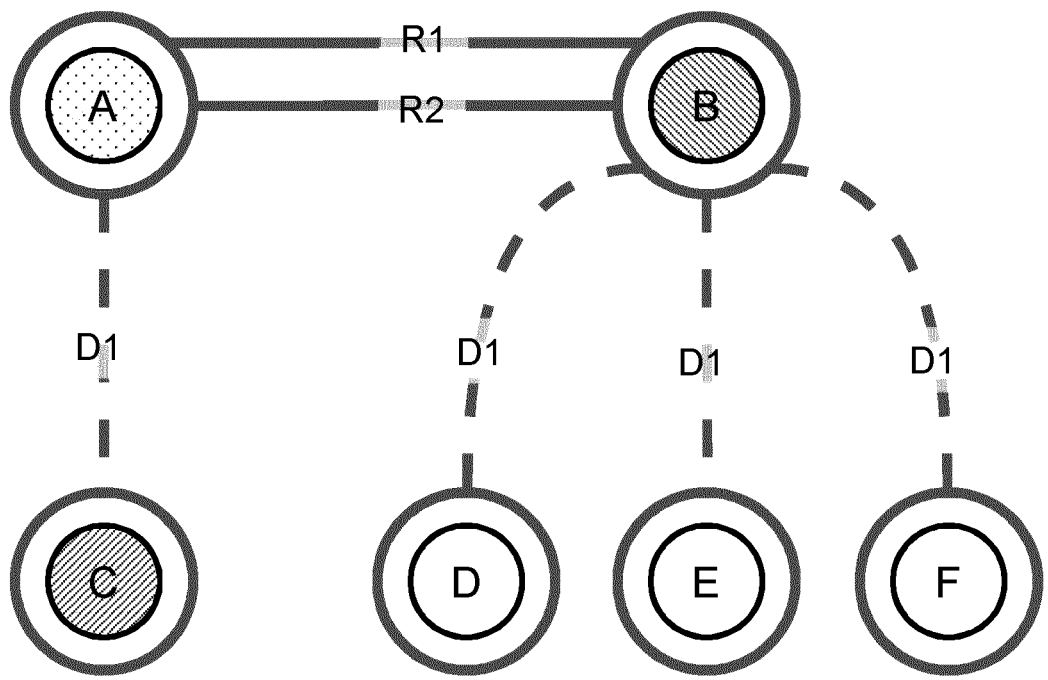

Even with more duplicates added, the entity entry can remain simple and understandable as illustrated in FIG. 6B showing the entity entry of FIG. 6A after adding two further duplicates E, F (matching with dataset B according to duplicate rule D1 in this example).

For the previous example with 10.000 datasets, that are very similar, the storage requirement may change as follows (assuming only five non-duplicates that completely match):
n=5 (number of non-duplicate datasets)
r=2 (number of matching rules, i.e. rules excluding the duplicate rule)
d=9.995 (number of duplicates assigned to any of the non-duplicates)
es=11 byte (edge size)

ds=4 byte (dataset ID size)

to: $(n*(n-1)/2*r*es)+((n+d)*ds)=(20*es)+(10.000*ds)=40.220$ byte, and thus resulting in slightly more than 39 KiB in comparison to ~1 GB without the proposed storing of duplicates. Although, this depends on how similar the data are and how the duplicate rule is defined, it shows the huge potential for saving storage space.

Note that the duplicates C, D could also be stored as edges in the form A:C:D1, B:D:D1, but that would require slightly more space and finding all duplicates of a dataset may be more elaborate compared to storing them separately.

Referring back to FIG. 1A, exemplary database system 100 further includes an index module 140 that is, when loaded into a memory 115 of computing unit 110 and executed by the computing unit 110 and processor(s) 111, respectively, configured to determine, for an input dataset IPDS and a given matching rule R', dataset identifiers $ID_{kj'}$ of already stored datasets $DS_{kj'}$ matching with the input dataset IPDS according to the given matching rule R'.

Further, exemplary database system 100 further includes a lookup module 150 that is, when loaded into memory 115 and executed by the computing unit 110, configured to determine, for an input of a dataset identifier $ID_{kj'}$ as e.g. determined by module 140, a storage location $SL_{kj'}$ of the corresponding entity entry $E_k$ on storage 120 or a reference to the storage location $SL_{jj'}$.

The underlying database structure 10 used by system 100 is illustrated in FIG. 1B.

Exemplary database structure 10 includes a distributed data storage structure 12 configured to store a plurality of different entity entries $\{E_k\}$, an index data structure 14 configured to store matching keys $MK_r$ each refer to a respective matching rule (the subscripts r refers to the rule identifier of matching rule R in this example), and dataset identifiers $ID_{kj}$ of the datasets $DS_{kj}$ corresponding to the respective matching key $MK_k$, and a lookup data structure 15 configured to store dataset identifiers $ID_{kj'}$ and a storage location $SL_{kj'}$ of the corresponding entity entry $E_k$ in the distributed data storage structure 12 or a reference to the storage location $SL_{kj'}$. The index data structure 14 can hold optimized data for searching during both the actual search and the matching process. This is also below with regard to FIG. 3B and relies on matching keys linked to matching datasets.

Assuming the following matching rules R1, R2:

R1: firstName, lastName and street must be case-insensitive equal

R2: firstName and lastName must be case-insensitive equal and datasets A, B:

TABLE II

| ID | firstName | familyName | street | houseNumber |
|---|---|---|---|---|
| A | Max | Muster | Wallstr. | 58 |
| B | Max | Muster | Fischerinsel | 1 | are given.

Then, a matching key for rule R1 may be created by concatenating the lower-case variants of the three fields firstName, lastName and street again using the seperator The same applies for rule R2. Additionally, the matching keys may be prefixed with the rule ID of the corresponding matching rule (and the separator).

Accordingly, the following four matching keys may be created:

R1:max:muster:wallstr. for data set A
R2:max:muster for data set A
R1:max:muster:fischerinsel for data set B
R2:max:muster for data set B While this is a simple to understand example, many real-world examples may use some kind of fuzzy matching.

For example, another matching rule R3 may be defined as:

R3: street are case-insensitive equal, firstName and lastName must match phonetically.

A phonetic match may e.g. be defined by using the metaphone algorithm and a maximum Levenshtein distance of 3. Note that the Levenshtein distance cannot be calculated without a second value to compare with. For the matching key generation this can however be ignored, resulting in false matches, that are later to be filtered out again. In particular, special care has to be taken during indexing (building and/or updating the index data structure 14) in order to be able to filter false matches.

For matching rule R3 the following matching keys may be created:

R3:wallstr.:MKS:MSTR for data set A
R3:fischerinsel.:MKS:MSTR for data set B

The index data structure 14 may be implemented as an index table mapping matching keys for the matching rules with corresponding data.

In particular, index data structure 14 may have the following fields and rows or columns, respectively:

matchingKey: data type string, primary key,
matchingData: data type stringset

After indexing the dataset A with respect to rules R1-R3 of the previous example, the index table 14 may contain the following entries including rule IDs R1-R3:

TABLE III

| matchingKey | matchingData |
|---|---|
| R1:max:muster:wallstr. | {"A"} |
| R2:max:muster | {"A"} |
| R3:wallstr.:MKS:MSTR | {"A:Max:Muster"} |

For the rules R1 and R2 the fields for matchingData typically only contain a reference to the dataset ID "A". Different thereto, further data for finding the Levenshtein distance after searching the database are desired for matching rule R3. For this reason, the matchingData for rule R3 also contains the original firstName and the original lastName of dataset A (i.e. the dataset referred to by dataset ID "A").

After further indexing the dataset B, i.e. determining matching keys and matching data for dataset B and storing these values in the index table 14, the index table 14 may contain these entries:

TABLE IV

| matchingKey | matchingData |
|---|---|
| R1:max:muster:wallstr. | {"A"} |
| R2:max:muster | {"A","B"} |
| R3:wallstr.:MKS:MSTR | {"A:Max:Muster"} |
| R1:max:muster:fischerinsel | {"B"} |
| R3:fischerinsel.:MKS:MSTR | B:Max:Muster"} |

Since the matching key for the rule R2 is the same for both data sets, the matchingData for dataset B are added to the already existing matching key for R2.

Typically, duplicates, for example the duplicates C, D in table I above, are not indexed. This is because it is not required for searching to access duplicates. Accordingly, storage space can be kept low.

During operation of system 100, an instance of index data structure 14 may be accessed by index data module 140 and an instance of lookup data structure 15 may be accessed by index data module 140.

Both the index data structure 14 and the lookup data structure 15 may be a respective array structure or table structure.

For scalability and performance reasons, a respective document database like e.g. AWS DynamoDB as offered by Amazon may be used for implementing the index data structure 14 and the lookup data structure 15.

As illustrated in FIG. 1C schematically illustrating a module 150' that may be used in database system 100 as lookup module, the process of determining the storage location $SL_{k'j'}$ for dataset identifiers $ID_{k'j'}$ is typically performed in two steps.

In a first step, an entity/identity identifier (in the following also referred to as entity-ID for short) may be determined for the dataset identifier $ID_{k'j'}$. Thereafter, the storage location $SL_{k'j'}$ of the corresponding entity/identity $E_{k'}$ may be determined.

This may be done using one index table or two index tables.

The one table embodiment may use an additional type field to distinguish the entries.

The following description refers to the one (lookup) table embodiment.

The first type of fields in a lookup table refers the unique dataset IDs (ID k r).

The second type of fields in the lookup table refers to the entity/identity ID

Each entity/identity may have exactly one reference entry in the lookup table 15, which is pointing to its current storage place (file).

For better understanding, the following example with three simplified datasets referred to by dataset IDs A, B, C are given:

TABLE V

| ID | firstName | familyName | street | houseNumber |
|----|-----------|------------|--------------|-------------|
| A  | Max       | Muster     | Wallstr.     | 58          |
| B  | Max       | Muster     | Fischerinsel | 1           |
| C  | Sabine    | Muster     | Wallstr.     | 58          |

When datasets A and B belong to identity (person) 1 and dataset C belongs to identity (person) 2, the lookup table may look:

TABLE VI

| id | Type      | location | entityFilePath   |
|----|-----------|----------|------------------|
| 1  | IDENTITY  |          | s3://irfiles/1_v3 |
| A  | REFERENCE | 1        |                  |
| B  | REFERENCE | 1        |                  |
| 2  | IDENTITY  |          | s3://irfiles/2_v13 |
| C  | REFERENCE | 2        |                  |

In addition to the fields "id" and "entityFilePath", further fields like a created and updated timestamp may be stored in the lookup table VI.

Thus, the storage location (entityFilePath) for the dataset identifiers (id) A, B, C can be determined via the "location" column in two steps.

For finding duplicates, indexing of datasets, matching of datasets, and searching for stored datasets different respective rule sets which may be based on different expectations can be used.

In particular, a duplication rule set may be used for identifying non-identical duplicates as explained above.

Different kinds of datasets might require different kinds of duplication rules. For example, the entity entries may contain predicates for persons and devices assigned to them. Accordingly, there might be a duplication rule focusing on the personal data (name, address, . . . ) and another rule that focusses on the serial number of a device.

Further, a matching rule set may be used for determining which datasets belong to the same entity entry. These rules are to evaluated while adding new datasets after the duplication rule(s) has/have been applied for finding duplicates (deduplication).

Further, one or more search rule sets may be used for searching. Note that the rules of the search rule set(s) can be equal or different from the matching rules.

Any rule that belongs to any of the previous rule sets, may be provided in an index rule set to facilitate creating and updating the index data structure 14 as well as finding data using these rules and the index data structure 14.

For example, for the following rules:
P1: firstName, lastName and street must be case-insensitive equal
P2: firstName and lastName must be case-insensitive equal
D1: firstName, lastName, street and houseNumber must be case-insensitive equal
H1: lastName must be case-insensitive equal
the following five rule sets may be defined:
duplication rule set: D1
matching rule set: P1, P2
person search rule set: P1, P2
household search rule set: H1
index rule set: D1, P1, P2, H1

In this example, datasets having the same name and address attributes (predicates) will be considered as duplicates and are not to be indexed (again). Using the person search rule set for searching it is possible to find the person via at least first name and last name. In addition, using the household search rule set allows searching only for a last name which will return all identities of family members.

Searching for Max Muster and the person search rule set in entity entries with the datasets A, B, C of table V will return one identity with the datasets A and B.

When searching for Max Muster and the household search rule set, then two entity-IDs (identities) will be returned. One with the datasets A and B and another one with the dataset C.

Note that rules may also be conditional.

For example, with a slight modification the previous rule P2 may be changed from:
P2: firstName and lastName must be case-insensitive equal
to:
P2': firstName and lastName must be case-insensitive equal, if lastName and firstName both have at least four letters.

If e.g. a person with the name "Max Muster" would be provided, then it would no longer be indexed and used for matching.

Defining rules and rule sets may be implemented in different ways ranging from hard coded solutions over using decision/rule engines to artificial intelligence-based solutions.

Typically, the at least one of, more typically all of the following conditions hold:
a) For any given input to a rule set, a list of matching keys and matching data is returned.
b) The calculation of the matching keys and matching data is deterministic.
c) The matching data contain the identifier of the input.
d) The matching key include, in particular are prefixed with the rule ID.
e) When two matching keys are not equal, then the two inputs do not match with each other.
f) When two matching keys are equal, then the two inputs may match with each other and further comparison of the matching data should be performed.
g) However, when two matching keys are equal and the matching data only contains the two dataset IDs, then the two inputs do match with each other.
h) When two matching keys are equal and the matching data contains more than the corresponding dataset IDs, then each of the additional data parts from one input should be compared with the corresponding data part from the other input according to the defined rules (e.g. calculate Levenshtein distance of the last name and match if a certain threshold was not exceeded).

Note that generating the matching keys is comparable with what is typically called blocking in other approaches.

Further, each rule should allow for creating a matching key that are as precise as possible.

For example, for the rule
R1: firstName, lastName and street must be case-insensitive equal
it is possible to create a matching key only on one of the attributes, i.e. the lastName. However, this may result in many entries sharing the same matching key even though they are not matching. Therefore, all attributes for creating the matching key should be included in this example rule.

In a more complex example, the following rule:
R3: street must be case-insensitive equal, firstName and lastName must match phoneticaly, a phonetic match is defined by using the metaphone algorithm and a maximum levenshtein distance of 1
as well as datasets (inputs), matching keys and matching data for matching rule R3 are given:

TABLE VII

| id | firstName | lastName | street | matching key | matching data |
|---|---|---|---|---|---|
| A | Maik | Muster | Wallstr. | R3:Wallstr.:MK:MSTR | A:Maik:Muster |
| B | Meik | Muster | Wallstr. | R3:Wallstr.:MK:MSTR | B:Meik:Muster |
| C | Maggie | Muster | Wallstr. | R3:Wallstr.:MK:MSTR | C:Maggie:Muster |

Based on the matching keys in tab. VII, all three entries A-C might match with each other.

Considering the matching data comparison between A and B.

The street does not need further consideration. For that reason it is not part of the matching data and will not be checked again.

The matching data can be split by the colon and then the first name and the last name can be compared individually.

According to R3, the first name has to match phonetically within a maximum Levenshtein distance of 1. The phonetic check has already been done because it is part of the matching key. The Levenshtein distance between Maik and Meik is 1 (one replacement). The last name is the same in both inputs. As a result, data of datasets A and B match.

The same procedure can be used for comparing A and C. The Levenshtein distance between Maik and Maggie is 3. Thus, the threshold is exceeded and as a result data of datasets A and C do not match. Data of datasets B and C do not match for the same reason (Levenshtein distance on the first name is 4).

Searching is the process of finding previously assembled entities represented by entity IDs (in particular identities) and typically all or parts of their data (entity entries).

Often, searching has be very fast and respond within milliseconds, respectively. The previously described data structure allows for desired fast response.

For any provided input search the first step is to create its matching keys and matching data ($d_{search}$) using the rule set for the selected search.

For example, the following matching keys and matching date may be determined for a $d_{search}$:

TABLE VIII

| matching key | matching data |
|---|---|
| R1:maik:muster:wallstr. | {SEARCH} |
| R2:maik:muster | {SEARCH} |
| R3:Wallstr.:MK:MSTR | {SEARCH:Maik:Muster} |

With these matching keys a search can be performed in the index table using the primary key. This will then return potential matches and their matching data ($d_{index}$):

TABLE IX

| matching key | matching data |
|---|---|
| R1:maik:muster:wallstr. | {A} |
| R2:maik:muster | {A} |
| R3:Wallstr.:MK:MSTR | {A:Maik:Muster, B:Meik:Muster, C:Maggie:Muster} |

Afterwards, each $d_{search}$ and $d_{index}$ with the same matching key may be compared to remove invalid matches. The result (also called hits) of that comparison is a list of datasets and their matching rules are given in table X:

| data set id | rule ids |
|---|---|
| A | {R1, R2, R3} |
| B | {R3} |

With the hits data set IDs, a search in the lookup table 15 may be performed to find the following exemplary reference entries:

TABLE XI

| id | type | location |
|---|---|---|
| A | REFERENCE | 1 |
| B | REFERENCE | 1 |

The location is the ID of the entity. Another search may be performed to receive the storage path of the entity entry (file) that may look:

TABLE XII

| id | type | entityFilePath |
|---|---|---|
| 1 | IDENTITY | s3://irfiles/1_v4 |

While downloading the entity entry (identity file) it is recommended to parse and process each line (each dataset) in parallel. This increases the performance and reduces the memory requirements.

Processing the datasets may include filtering, e.g. filtering predicates (attributes) using JSON path, and/or enriching the attributes.

Thereafter, a response may be created which may contain the entity-ID (1 in table XI), selected predicates of the datasets and/or edges.

In JSON and assuming that only the firstName was selected as relevant attribute (predicate), such an identity response may look:

```
{
  "identities": [
    {
      "id": "1",
      "edges": [
        "A:B:R3",
        "A:E:R4",
        "A:E:R6"
      ],
      "duplicates": {
        "B": ["D"]
      },
      "attributes": {
        "A": {
          "firstName": "Maik"
        },
        "B": {
          "firstName": "Meik"
        },
        "D": {
          "firstName": "Meik"
        },
        "E": {
          "firstName": "Maik"
        }
      }
    }
  ]
}
```

Depending on the rules and the datasets it is possible that multiple entity-IDs are found. In this event, everything after the entity-IDs were resolved can be parallelized, including receiving the file location, downloading the file and enriching the predicates (attributes). In the end, each of the entity IDs can be returned in the resulting list.

Even though the time complexity of the search is O(n), effectively in a real application it is dependent on the data set distribution among all datasets and the number of created entity entries each having an entity-ID. More entity entries do not slow down the search. However, more datasets within an entity entry will slow down the search, but will never exceed O(n).

Typically, the data will be organized in many independent entity entries. Searching typically returns only a few data compared to the whole amount of possible results. Often the found data belong to the same dataset or at least to the same entity entry. If they belong to multiple entity entries, then they can be resolved in parallel. For that reason finding a single entity requires exactly four accesses to (external) data resources (search index, find entity-ID, find entity lookup entry and download entity file). Transitive datasets are stored in the same entity entry and therefore do not require additional accesses.

FIG. 2 shows a block diagram of a database system 200. Database system 200 is similar to database system 100 as explained above with respect to FIG. 1A to 1C and also has a computing unit 210 with one or more processors 211, a storage 220 accessible by the computing unit 210 as well as an index module 240, and a lookup module 250 which run in a memory (in particular a RAM) 215 of computing unit 210 accessible by one or more processors 211.

In addition, database system 200 has a control module 260 that may be used, when running, for different control tasks.

In the embodiment illustrated in FIG. 2, control module 260 is used for receiving one or more inputs $\{A_{inp}, B_{inp}\}$.

Further, control module 260 is typically configured for extracting data from the input(s) $\{A_{inp}, B_{inp}\}$ as respective input dataset(s) IPDS.

Typically, control module 260 may use or include a matching module as explained with regard to FIG. 3A to search for a stored dataset having data matching with data of the input (input data set), a search module as explained below with regard to FIG. 4B and/or an assemble module as explained below with regard to FIG. 4B.

The processes of matching and searching are similar, however during matching a dataset identifier is present, while a dataset identifier may not be present during searching for a new input (dataset).

Control module 260 may further be configured to add the datasets of the input $A_{inp}$ to a stored dataset found during the search.

Further, control module 260 may be used for creating a new entity entry on storage 220 comprising a dataset with data of the input if no stored dataset comprising data matching with the data of the input are found, determining, for the new dataset and an index rule, a new matching key and a matching edge, and storing the new matching key and a dataset identifier for the new dataset in the instance of the index data structure.

Figure 3A:
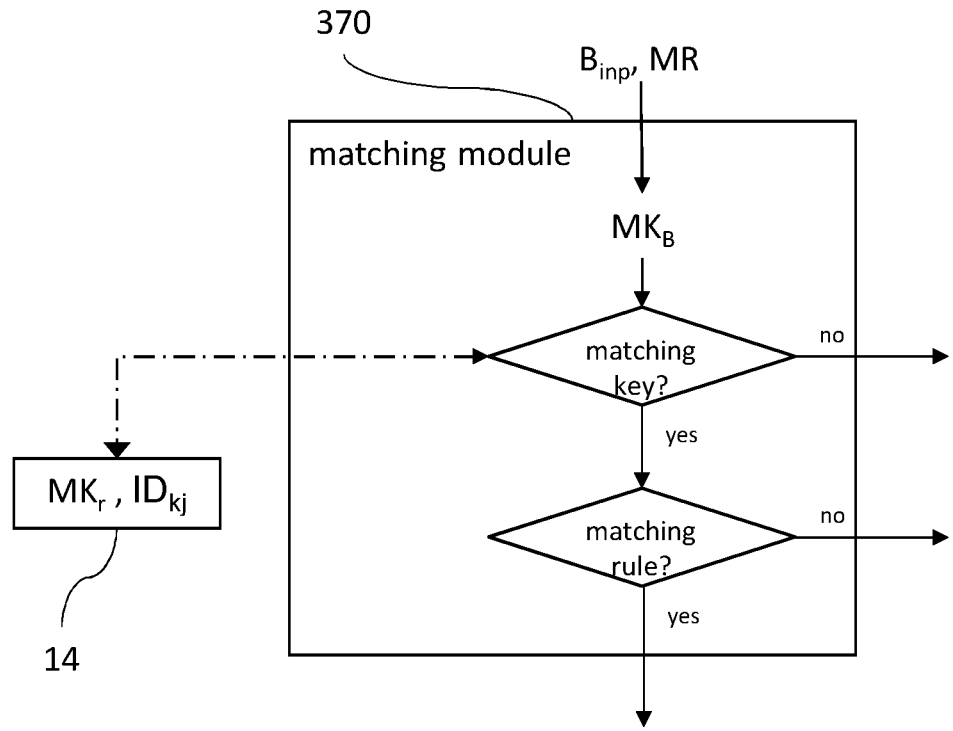
FIG. 3A is a block diagram schematically illustrating a database system including a module that may also be used in the database systems illustrated in FIG. 1A and FIG. 2 according to an embodiment.

FIG. 3A is a block diagram schematically illustrating a database system 300 including a matching module 370 that may also be used in the database systems 100, 200 illustrated in FIG. 1A and FIG. 2.

Matching 370 determines whether two datasets are to be considered similar (and therefore belong to the same entity and entity entry, respectively) or not. The matching is relevant during identifying duplicates, adding a new dataset and while searching for an entity.

Typically, the matching works on an input dataset that has been indexed previously and a (not yet indexed) current input dataset. The current input dataset can be either a search input dataset (also referred to as search input for short) or a new dataset to be added to one of the entity entries or even as (part of) a new entity entry.

After receiving an input $B_{inp}$ with data and a matching rule MR typically selected from a matching rule set, matching module 370 may determine a new matching key $MK_B$.

Thereafter, matching module 370 may access the instance of the index data structure 14 to search therein for matching keys $MK_r$ that match with the new matching key $MK_B$.

If no matching keys $MK_r$ stored in the instance of the index data structure 14 are found during the searching, module 370 may return "no" indicating that the data of input $B_{inp}$ do not match with already stored data (for rule MR).

Otherwise, matching module 370 may search for rules with equal matching keys. This may include comparing the data with datasets referred to by the found matching keys.

If at least one rule is found during searching for rules with equal matching keys, matching module 370 may return "yes" indicating that the data of input $B_{inp}$ match with already stored data (according rule MR) and "no" otherwise.

Figure 3B:
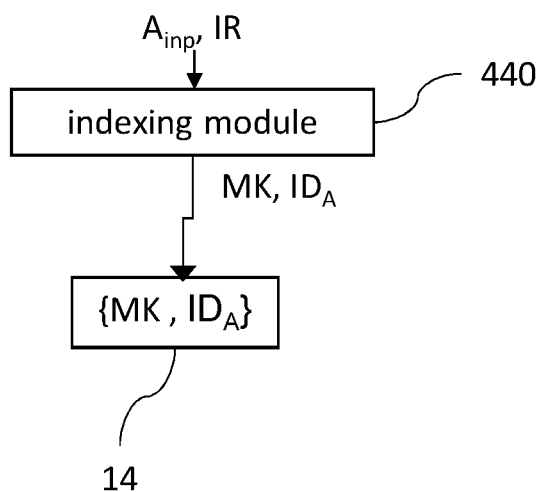
FIG. 3B is a block diagram schematically illustrating a database system including a module that may also be used in the database systems illustrated in FIGS. 1A, 2, 3A according to an embodiment.

FIG. 3B is a block diagram schematically illustrating a database system 400 including an indexing module 440 that may also be used in the database systems illustrated in FIG. 1A to FIG. 3A, for example as part of a respective control module. Indexing module 440 may be used to determine for data of an input A and index rules IR (typically of an index rule set including all so far used rules) a respective new matching key MK, and to store the new matching key MK and matching data $ID_A$ in the instance of the index data structure 14 or to update an existing matching key MK k with new matching data ID k including the entity ID $ID_A$ of the entity file the data of input A are (to be) stored in.

Figure 4A:
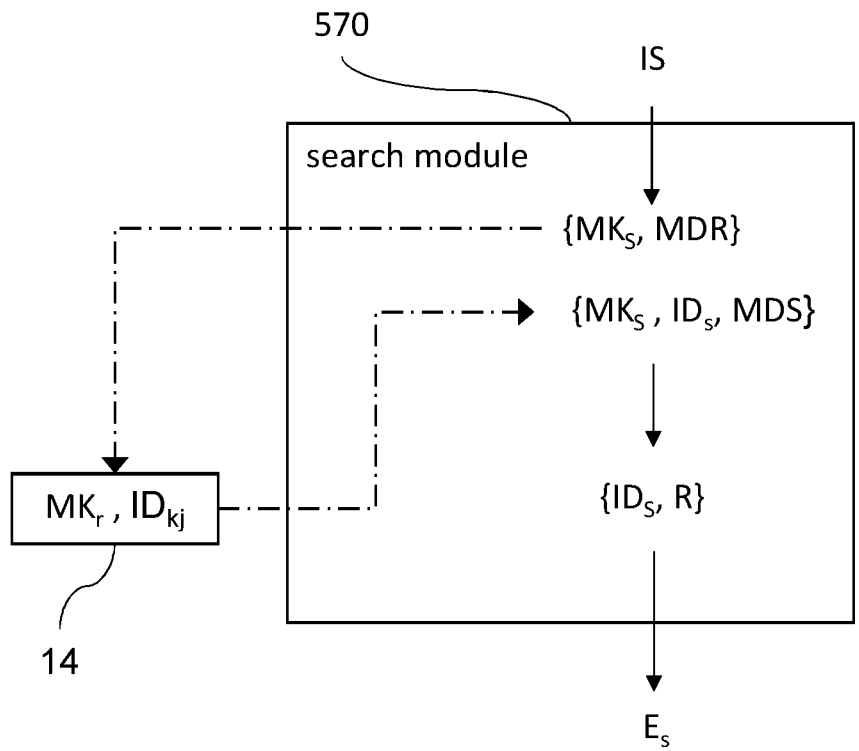
FIG. 4A is a block diagram schematically illustrating a database system including a module that may be used in the database systems illustrated in FIGS. 1A, 2-3B according to an embodiment.

FIG. 4A is a block diagram schematically illustrating a database system 500 including a search module 570 that may also be used in the database systems illustrated in FIG. 1A to FIG. 3B.

Search module 570 may be used to create, for an input search IS with data (but typically without a dataset ID), a matching key $MK_S$ and first matching data MDR, to use the matching key $MK_S$ to search in the instance of the index data structure 14 for dataset identifiers $ID_{kj}$ of matching datasets, to determine a list of dataset identifiers $ID_{kj}$ of the datasets and their rule identifiers R, to use the dataset identifiers $ID_{kj}$ of the list to determine a storage place of an entity entry $E_s$ comprising the datasets $DS_{kj}$, and/or retrieve the entity entry $E_s$ (at least in part).

Figure 4B:
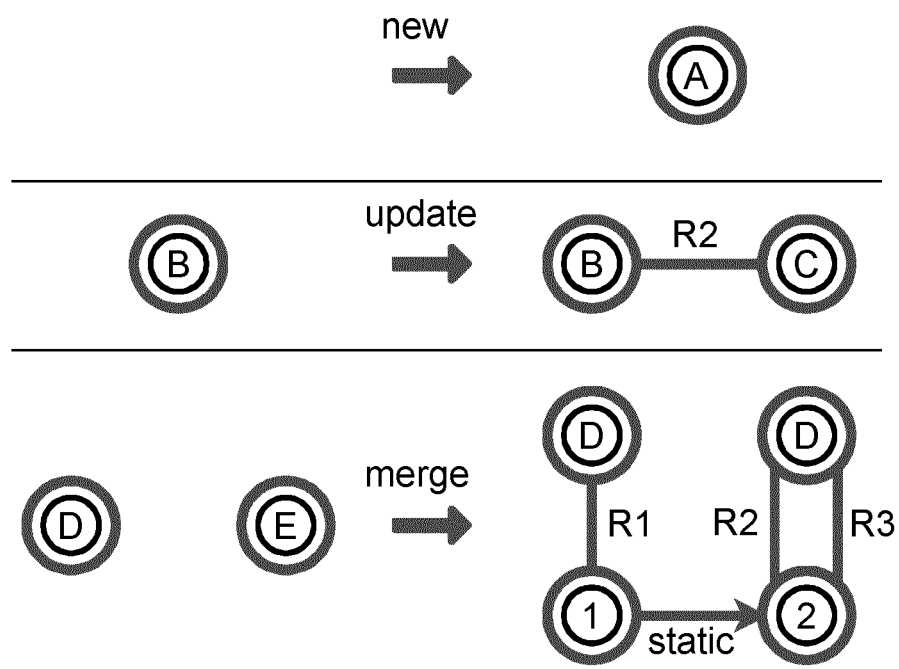
FIG. 4B schematically illustrates a database system including a module that may also be used in the database systems illustrated in FIGS. 1A, 2-4A according to an embodiment.

FIG. 4B schematically illustrates a database system 500 including a module 680 that may also be used in the database systems 570 that may also be used in the database systems illustrated in FIG. 1A to FIG. 4A.

Assemble module 680 may be used to search in the instance of the index data structure if data of a new dataset match with data of stored datasets stored.

If this is not true, assemble module 680 may create a new entity entry (entity ID A, top of FIG. 4A), e.g. when no data for Max Muster was added before.

If the data of the new dataset match with data of only one of the already stored datasets, assemble module 680 may update an entity entry C already stored in the database system, e.g. when data for Max Muster was added before.

Further, assemble module 680 may merge respective entity entries if the data of the new dataset match with data of more than one of the datasets already stored in the database system (bottom of FIG. 4A).

For example, if a super dataset contains (proofs) the relocation of Max Muster from Berlin to Hamburg and data for Max Muster was added previously in both cities, but no link between the two entity entries D, E existed so far, entity entries D, E referring to Berlin and Hamburg may be merged (to one entity entry with entity ID D in the exemplary embodiment).

Figure 7:
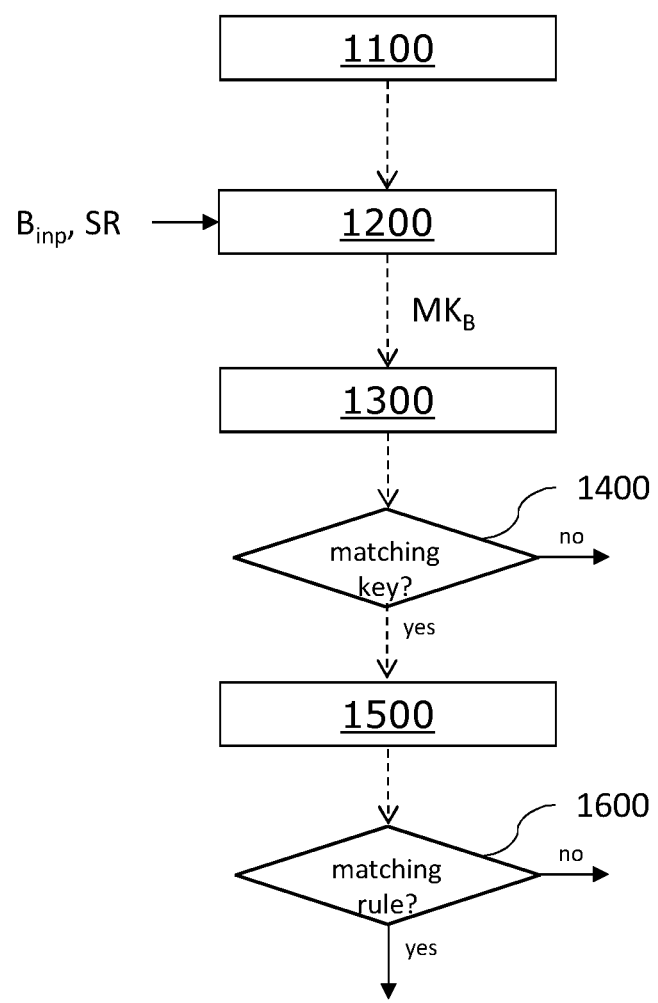
FIG. 7 illustrates a flow chart of a method for creating, maintaining, managing and/or using a database according to embodiments.

FIG. 7 illustrates a flow chart of a method 1000 for creating, maintaining, managing and/or using a database and/or a database system.

In a first block 1100, a database system 100-700 as explained herein and/or an instance of database structure as explained herein are provided.

In a subsequent block 1200, an input $B_{inp}$ with data are received, for example by a control module of the provided database system, and a corresponding matching key $M_{KB}$, may be determined for the input $B_{inp}$ and a selected rule IR.

Thereafter, a search for matching keys $MK_r$ stored in an instance of an index data structure 14 that match with the new matching key $MK_B$ may be performed, in a block 1300.

In a subsequent block 1400, it may be checked if data of input $B_{inp}$ match with data of stored datasets if no keys $MK_r$ stored in the instance of the index data structure 14 matching the new matching key $MK_B$ are found during the searching for the matching keys.

If block 1400 returns "yes" (or any other indicator for true), a searching for rules with equal matching keys may be performed in block 1500.

Thereafter, it may be determined in block 1500 that the data of the input $B_{inp}$ match with data of stored datasets if at least one rule is found during searching for rules with equal matching keys, and that the data of the input do not match otherwise.

Thereafter, one or more entities (i.e. entity IDs) to which the data of the input $B_{inp}$ belong may be determined, the corresponding entity entries updated or merged, and/or the corresponding entity entries at least in part retrieved and optionally further processed, typically in real or near real time.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise. Further, terms such as "first", "second", and the like, are also used to describe various elements, regions, sections, etc. and are also not intended to be limiting. Like terms refer to like elements throughout the description.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A database system comprising:
a computing unit comprising a processor;
a storage accessible by the computing unit, and storing different entity entries, at least one of the entity entries comprising a header and datasets, the datasets comprising data and a dataset identifier, the header comprising a matching edge, the matching edge comprising a matching rule or a reference to the matching rule, and the dataset identifiers of the datasets matching pairwise with each other according to the matching rule; and at least one of:
an index module that is, when executed by the computing unit, configured to determine, for an input dataset and a given matching rule, dataset identifiers of datasets matching with the input dataset according to the given matching rule; and
a lookup module that is, when executed by the computing unit, configured to determine, for an input of one of the dataset identifiers, a storage location of the corresponding entity entry on the storage or a reference to the storage location;
wherein at least one of the datasets comprises a first primary dataset and a first secondary dataset matching with the first primary dataset both according to the matching rule and according to a duplicate rule which is different to the matching rule, wherein the header further comprises a duplicate edge, the duplicate edge comprising the duplicate rule of a reference to the duplicate rule, the dataset identifier of the first primary dataset and the dataset identifier of the first secondary dataset, wherein the header has at most, typically less than N−1 matching edges per matching rule, with N being a whole number larger than zero corresponding to the number of datasets of the respective entity entry, and/or wherein the header of the entity entry does not comprise an matching edge referring to the first primary dataset and the first secondary dataset.

2. The database system of claim 1, wherein the header of at least one of the entity entries comprises several matching edges comprising a respective matching rule, wherein the respective matching rule is selected from a set of rules, and/or wherein the header comprises a static edge and/or a dynamic edge.

3. The database system of claim 1, wherein the header of at least one of the entity entries further comprises a list of the dataset identifiers of a respective entity entry.

4. The database system of claim 1, wherein each entity entry refers to a respective object, such as an entity or identity, in particular an object of the same type, typically to one object only, wherein each dataset refers to predicates of the respective object.

5. The database system of claim 1, wherein each dataset is stored in one entity entry only, and/or wherein the entity entries are stored in a distributed database structure and/or as separate files.

6. The database system of claim 1, wherein the at least one of the datasets further comprises a second primary dataset matching with at least one of the first primary dataset and the first secondary dataset according to the matching rule, and wherein the second primary dataset does not match with the first secondary dataset according to the duplicate rule.

7. The database system of claim 1, wherein the index module is, when executed by the computing unit, configured to access an instance of an index data structure linking matching keys, which refer to a respective index rule, with dataset identifiers of the datasets corresponding to the matching keys.

8. The database system of claim 7, wherein at least one of the matching keys further comprises data of the corresponding dataset and/or a rule identifier for the matching rule.

9. The database system of claim 7, wherein the instance of the index data structure is implemented as a table or array.

10. The database system of claim 1, wherein the lookup module is, when executed by the computing unit, configured to use an array structure or a table structure to determine the storage location for the one of the dataset identifiers.

11. The database system of claim 7, further comprising a matching module that is, when executed by the computing unit, configured to at least one of:
access the instance of the index data structure;
receive an input comprising data;
determine, for the input and a selected rule, a new matching key;
search, in the instance of the index data structure, for matching keys that match with the new matching key;
determine that the data of the input do not match with data of stored datasets if no matching keys stored in the instance of the index data structure are found during the searching for the matching keys;
search for rules with equal matching keys, searching for rules comprising comparing the data with datasets referred to by the matching keys found during the searching;
determine that the data of the input matches with data of stored datasets if at least one rule is found during searching for rules with equal matching keys; determining that the data of the input do not match with data of stored datasets if no rule is found during searching for rules with equal matching keys;
create a matching edge for the data of the input matching with the data of stored datasets; and
marking the created matching edge as dynamic edge.

12. The database system of claim 1, further comprising a search module that is, when executed by the computing unit, configured to:
create, for an input search, a matching key comprising a rule identifier and first matching data;
use the matching key to search in the instance of the index data structure for dataset identifiers of matching datasets;
determine a list of dataset identifiers of the datasets and their rule identifiers;
use dataset identifiers of the list to determine a storage place of an entity entry comprising the datasets; and
retrieve the entity entry.

13. The database system of claim 11, further comprising a control module which is, when executed by the computing unit, configured to at least one of:
receive an input;
use the matching module to search for a stored dataset comprising data matching with data of the input;
add the data of the input to a stored dataset found during the search;
create a new entity entry comprising a dataset comprising the data of the input if no stored dataset comprising data matching with the data of the input is found;
determine, for the new dataset and an index rule, at least one of a new matching key and a matching edge; and
store the new matching key and a dataset identifier for the new dataset in the instance of the index data structure.

14. The database system of claim 1, wherein the control module comprises an assemble module that is, when executed by the computing unit, configured to:
- use the instance of the index data structure to search if data of a new dataset match with data of datasets stored in the database system;
- create a new entity entry if the data of a new dataset do not match with the data datasets already stored in the database system;
- update an entity entry if the data of the new dataset match with data of only one of the datasets already stored in the database system; and/or
- merge respective entity entries if the data of the new dataset match with data of more than one of the datasets already stored in the database system.

15. A method for creating, maintaining, managing and/or using a database, the method comprising:
- providing a database system according to claim 1; and the method further comprising at least one of:
  - receiving an input comprising data;
  - determining, for the input and a selected index rule, a new matching key;
  - searching for matching keys stored in the index data structure that match with the new matching key;
  - determining that the data of the input do not match with data of stored datasets if no keys stored in the instance of the index data structure matching the new matching key are found during the searching for the matching keys;
  - searching for rules with equal matching keys, searching for rules comprising comparing the data of the input with datasets referred to by the matching keys found during the searching; and
  - determining that the data of the input matches with stored datasets if at least one rule is found during searching for rules with equal matching keys, and that the data of the input do not match with data of stored datasets if no rule is found during searching for rules with equal matching keys.

16. The method of claim 15, after determining that the data of the input do not match with data of stored datasets, further comprising at least one of:
- determining a new dataset comprising the data of the input and a dataset identifier;
- creating a new entity entry comprising new dataset;
- storing the new matching key and a dataset identifier for the new dataset in the instance of the index data structure;
- merging respective entity entries if the data of the new dataset match with more than one of the datasets already stored in the database system; and
- updating an entity entry if the data of the new dataset match with only one of the datasets already stored in the database system, updating the entity entry typically comprising at least one of:
- determining a matching edge for the data of the input and the data of the one of the datasets already stored in the database system; and
- using the duplicate rule for determining a duplicate edge for the data of the input and the data of the one of the datasets already stored in the database system.

17. A database structure comprising:
- a distributed data storage structure configured to store a plurality of different entity entries, each entity entry being configured to store datasets, the datasets comprising data and a dataset identifier, each entity entry further being configured to store a header comprising matching edges, each matching edge comprising a matching rule or a reference to the matching rule, and the two dataset identifiers of any pairs of datasets which match with each other with respect to the matching rule, wherein each of the headers of the entity entries is configured to store a duplicate edge, the duplicate edge comprising a duplicate rule or a reference to the duplicate rule, and dataset identifiers of pairs of datasets which match with each with respect to the duplicate rule, wherein the duplicate rule is different to the match rule.

18. The database structure of claim 17, wherein each of the headers of the entity entries is configured to store at least one of:
- matching edges comprising a further rule; and
- a list of the dataset identifiers of a respective entity entry.

19. The database structure of claim 17, further comprising at least one of:
- an index data structure configured to store matching keys, which refer to a respective matching rule, and dataset identifiers of the datasets corresponding to the respective matching key; and
- a lookup data structure configured to store dataset identifiers and a storage location of the corresponding entity entry in the distributed data storage structure or a reference to the storage location.

20. A method for creating, maintaining, managing and/or using a database, the method comprising:
- providing an instance of a database structure according to claim 17;
- providing an instance of an index data structure linking matching keys, which refer to a respective index rule, with dataset identifiers of datasets corresponding to the matching keys;
- receiving an input comprising data;
- determining, for the input and a selected index rule, a new matching key;
- searching for matching keys stored in the instance of the index data structure that match with the new matching key;
- determining that the data of the input do not match with data of stored datasets if no keys stored in the instance of the index data structure matching the new matching key are found during the searching for the matching keys; and thereafter, at least one of:
- determining a new dataset comprising the data of the input and a dataset identifier;
- using the duplicate rule for determining a duplicate edge for the data of the input and data of a dataset already stored in the database system.

* * * * *